INVENTOR
Arthur Holt
BY Max L. Libman & Joseph A. Genovese
ATTORNEYS

CHARACTER RECOGNITION USING CURVE TRACING

Filed Feb. 21, 1961 3 Sheets-Sheet 2

INVENTOR
Arthur Holt
BY Max L. Libman
Joseph A. Genovese
ATTORNEYS

CHARACTER RECOGNITION USING CURVE TRACING

Filed Feb. 21, 1961 3 Sheets-Sheet 3

INVENTOR

Arthur Holt

BY Max L. Libman & Joseph A. Genovese

ATTORNEYS

3,142,818
CHARACTER RECOGNITION USING CURVE TRACING

Arthur W. Holt, Silver Spring, Md., assignor, by mesne assignments, to Control Data Corporation, Minneapolis, Minn., a corporation of Minnesota Filed Feb. 21, 1961, Ser. No. 90,725
14 Claims. (Cl. 340—146.3)

This invention relates to character recognition, and particularly to systems and machines for accurate, high speed character reading.

The art of character recognition has advanced to the stage where a number of character recognition machines have been proposed and some have been constructed. Many proposals involve character scanning by parallel lines and point-by-point map matching procedures for character identification. Others rely on specialized techniques such as examining "test points" of the character and identifying the character on the basis thereof (M. J. Rellis Patent No. 2,894,274). The W. Sprick Patent No. 2,838,602 discloses a system wherein the center of gravity of the character is located after which the character is specially scanned. Another interesting disclosure is found in Sprick Patent No. 2,738,499 describing a curve tracer made of a special scanning means wherein a scanning beam follows the outline of one side of a line trace during one part of the scan operation and the other side of the line trace during another part of the scan operation. A. V. Bedford in Patent No. 2,487,511 describes a character contour device producing an electrical signal whose frequency or amplitude corresponds to the contour of the character whereby a visual picture of the character can be reproduced.

It is, of course, impossible to discuss all approaches to the character recognition problem. The preceding are mentioned as exemplifying some of the proposed solutions, which proceed on the theory of curve tracing. Most of them require specialized, and sometimes complicated, scan systems. My invention requires no special nor complex scanning. I use any successive line producing scanner, e.g. the scanner shown in the J. Rabinow Patent No. 2,933,246 or a row of photocells or others. This is possible because my invention is only in the nature of a curve tracer.

To my best knowledge, my invention entails a new system of character identification based upon a new philosophy. Specifically, if a scan line crosses a character line, my invention remembers in time, or voltage, or space, or digits, etc., the crossing point, and if the next scan line (of the same character) crosses the character within a given area (of time, voltage value, space, etc.), it is concluded that the character line being investigated is continuous and this information is remembered. This is explained in detail below, in connection with a typical embodiment of my invention.

In one embodiment of the invention, when a vertical scan line first crosses a character line the crossing point is remembered and a gate system is set during a portion of the next (second) scan line. The duration or width of the gate is made to include a time, area, etc., slightly above and slightly below the remembered point but in the second scan line. By this I mean the gate system is open or sensitive during said second scan line slightly above and slightly below a horizontal projection of the first remembered crossing point, enabling the said next scan line to interrogate the character in a restricted area alongside of the first crossing. Now, if the second scan line crosses the character line within the interrogated sensitive area, the scanner output falls within the width of the gate system and is remembered; and the gate system is again set in the same way, but for the next scan line and this process continues to the end of the character line. To facilitate description, I define such a gate system as a "follower," although it only metaphorically "follows" a character line; and I define a scanner output falling within the gate as a "hit."

By examining the behavior of the follower, a characteristic trace of the line of the character being examined, can be developed and remembered. For example, if I assume a horizontally moving character area and a vertical scan made of a scan element moving from bottom to top of the character, my invention easily recognizes whether the characteristic trace is sloped up or down, curved or straight by observing whether the hits are early or late in the width of the gate system. Probably, more significant information, though, is the relationship which followers bear to each other, as explained below.

More than one follower is required to distinguish characters from each other. I impose this requirement for practical reasons. Paper handling difficulties are reduced if the paper is moved at the necessary high speed and the scanner is stationary or moved slowly. Preferably, I scan repeatedly in one general direction, using a flyback technique similar to ordinary television scanning, except that since the character moves relative to the scanning location, a transverse scan along one line is sufficient, as will be explained below:

For example, consider the letter X. The first follower is assigned and begins to function when a scan line crosses the lower left corner and there will be a wide space in the same scan line, and then another crossing. The second crossing assigns a second follower to operate simultaneously with the first but it investigates a different portion of the character. Now consider the letter F. The first crossing is long and the scanner will produce a long pulse. Means are provided for identifying such a pulse. The next few scan lines will produce a hit in the first follower gate system corresponding to the short horizontal leg of the F, and a second follower will be propagated along the upper horizontal bar of the F.

In the recognition of characteristic traces for the F, my recognition circuits observe the three followers producing (*a*) a vertical long line, and (*b*) two horizontal lines. This defines and identifies the character as an F in the system which will be shown. Followers which track the elemental lines of other characters yield other information on which to base an identification decision. For instance the left half of the character O is identified by recognizing an Alpha follower trace sloping down and to the right together with a simultaneously produced Beta follower trace sloped upward and to the right, plus a juncture at the adjacent ends of the traces. The subsequent description discusses the character A, and these are sufficient to understand how all characters of any type, language, symbols, etc., may be identified.

Accordingly, an object of my invention is to provide a character recognition technique which relies on gate systems following elemental lines of a character and developing remembered characteristic traces of the lines from which the character identity is concluded.

Another object of the invention is to provide means and disclose methods of character recognition by setting a gate system to accept and store significant information during character scanning, which indicates the characteristics (shapes) of lines making up the character.

Another object is to accomplish the proceeding objective during a single pass of the character past a scanner, or vice versa, and explicitly, without reversal or retracing of the character once the scanning operation begins.

Another object of the invention is to provide a character recognition procedure wherein there are means to discriminate between actual or significant character line terminations and print imperfections.

A further object of the invention is to provide a character recognition system compatible with a number of ordinary circuit techniques so that the invention may be practiced in numerous ways.

Other objects and features of importance will become evident in following the description of the illustrated form of the invention.

FIGURE 1 is an enlarged diagrammatic view showing the character A partially scanned and diagrammatically showing the behavior of one follower of the lines thereof.

FIGURE 1*a* is an enlarged fragmentary view showing in detail the behavior of the gate system as a part of one of the elemental lines of the character A in FIGURE 1 is being scanned.

FIGURE 1*b* is a diagrammatic view showing the traces of the gate systems in following the lines of the character A.

Figure 5:
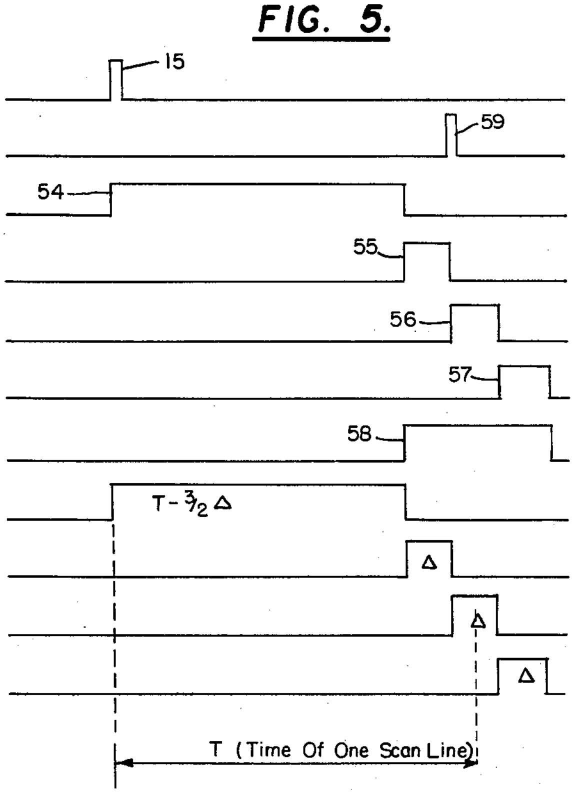
FIGURE 5 is a timing diagram.
Figure 5A:
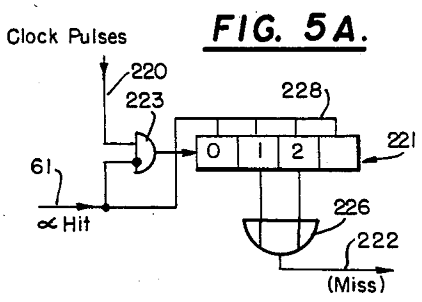

FIGURE 5*a* is a "flywheel" circuit for obviating the effect of a small break in the line being traced.

Figures 1, 1A, 1B:
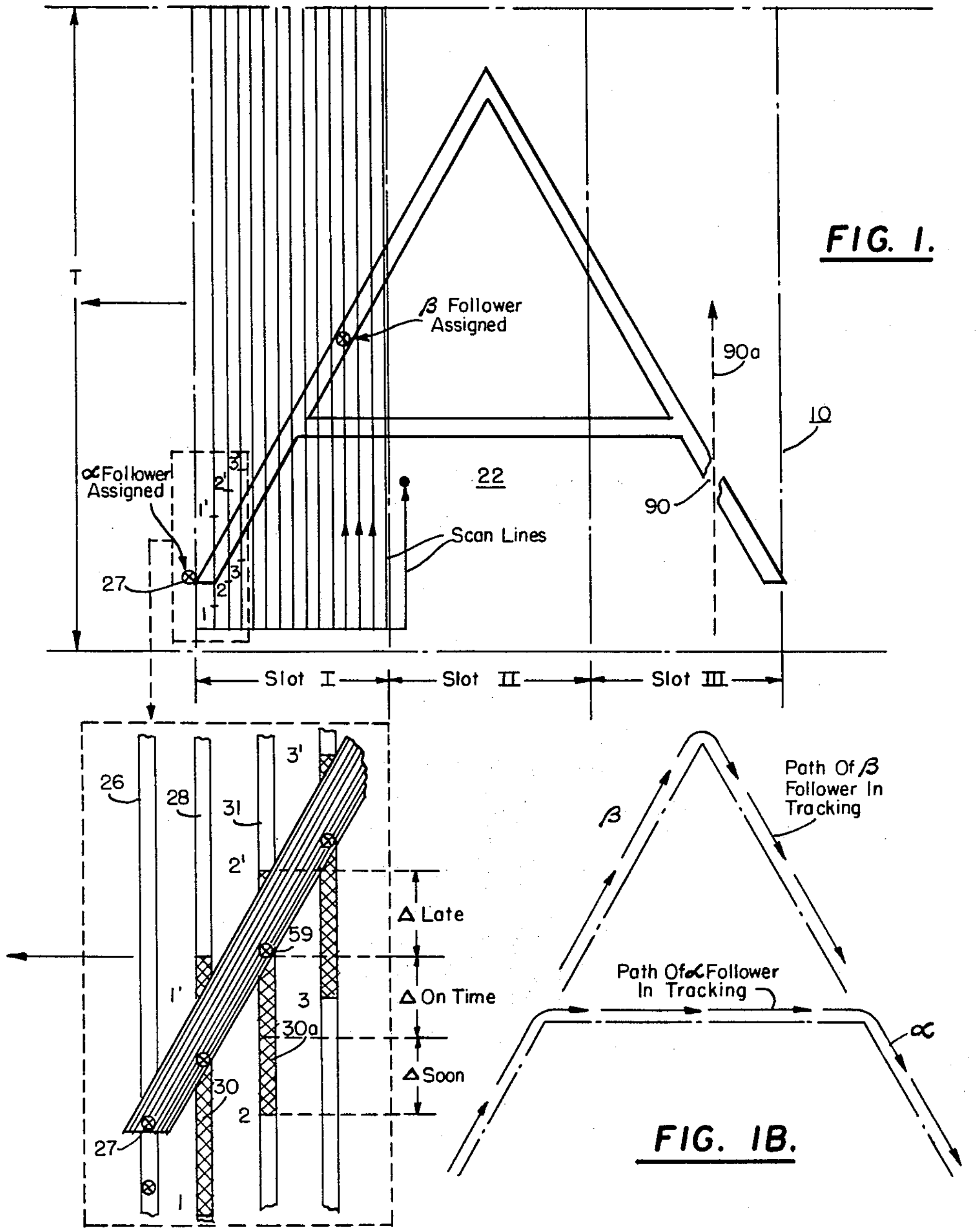
Figure 2:
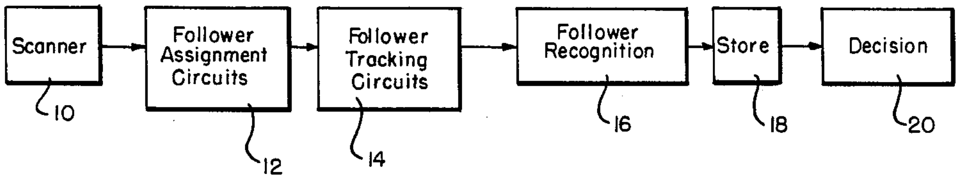
FIGURE 2 is a block diagram showing the organization of sections of a machine embodying the invention.

Before referring to the circuit details I prefer to summarize the theory of operation of my invention with particular reference to FIGURES 1–2. The basic elements of a character recognition machine include a scanner 10 (FIGURE 2) whose output information is fed to a follower (gate system) assignment network 12. After a follower 14 is assigned it tracks a line of the character to the significant end of the line. The behavior of the gate system or follower 14 which may be considered as forming the nucleus of the invention, is recognized by circuit network 16, and information therefrom is fed to storage 18 to ultimately feed decision section 20.

Figure 3:
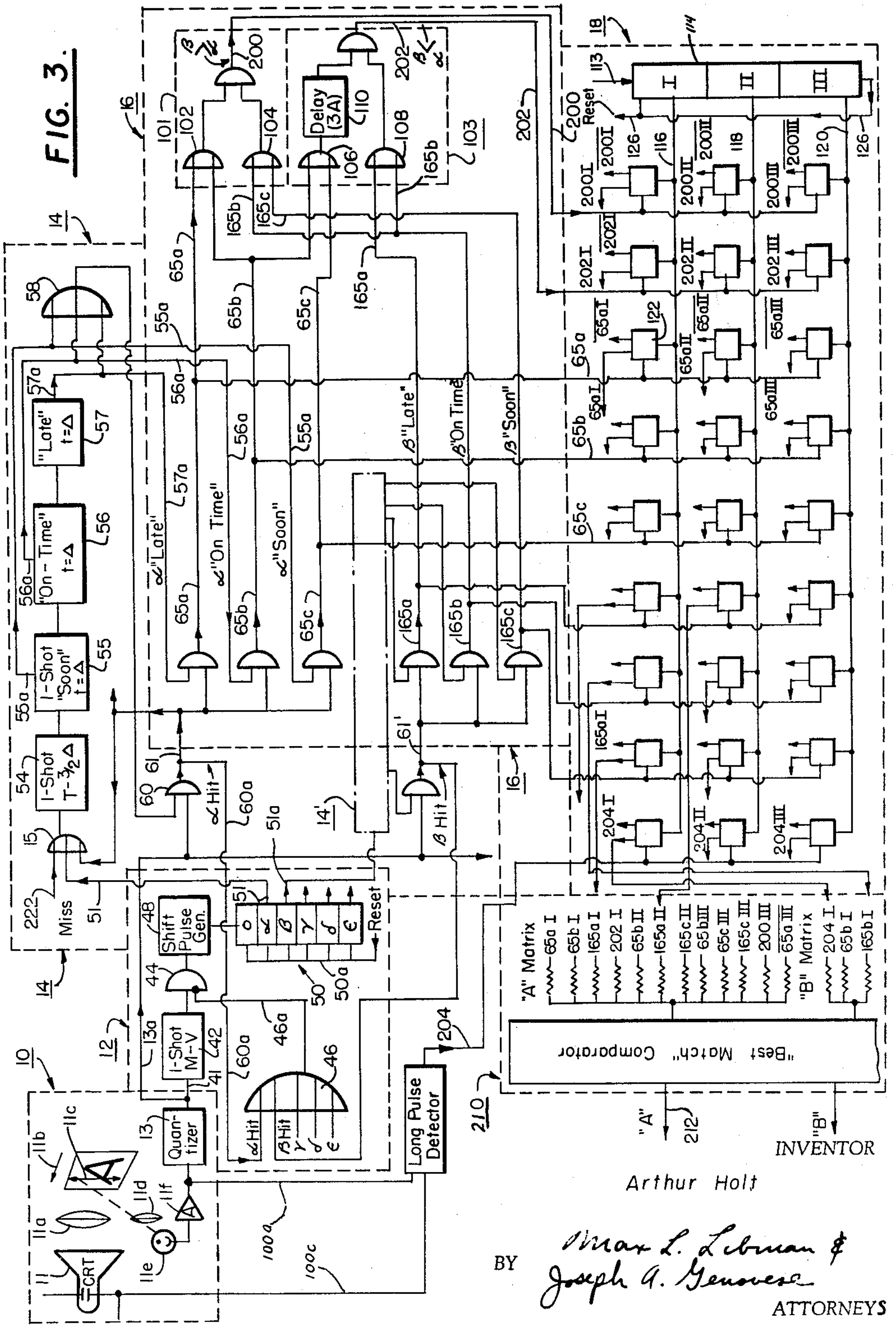
FIGURE 3 is a schematic circuit diagram in block and symbolic form, of an entire character recognition system according to the invention.

I have previously defined my use of the term "follower" and this can be better understood by referring to FIGURES 1–1*b*. As shown, area 22 moves horizontally to the left while scanner 10 produces vertical lines 26, 28, 31, etc., covering the area it moves. Assume that the scanner is a cathode ray tube made to provide a vertical line by movement of a scan element 24 from the bottom of the area to the top thereof, as shown in FIGURE 3. When the first scan line 26 touches or crosses a line of the character a circuit network 12 functions to set a gate system 14. The gate system becomes sensitive during the next scan line 28, to a crossing of the line of the character A, provided that the crossing is within the width 30 of the gate opening. I refer to this "width" of the gate (FIGURE 1*a*) as a "width" for convenience. Actually, in several embodiments the "width" of the gate is a given time of the movement of scan line 28, although if desired, the "width" could be considered as a given sub area 30 of interrogation in the actual scan line 28.

The gate system making up a part of the follower tracking circuits 14 is set to be receptive (open) at the time required for the scan element to move from the crossing point 27 of scan line 26 with the character line to the top of the scan line travel and from the beginning of scan line 28 to point 1 below the first intersection or crossing 27. The gate is set to close at point 1' time which is later than the time of one scan line, i.e. the time required for one scan line to move from the bottom of the scan area 22 to the top thereof.

If scan line 28 crosses a line of the character within the sub area 30 (FIGURE 1*a*) the gate is again set, creating sub area **30*a* with limits 2–2' in the next scan line 31**. This procedure, i.e. the setting and resetting of the gate is repeated until a significant termination of the character line.

In almost all cases two or more followers are required to identify a character, by recognition of the behavior of the gates as previously described. Follower assignment circuits 12 are such as to assign new followers when required. This phase of the invention will be described subsequently. The same holds true for the discrimination between significant terminations of lines and mere imperfections in the print.

FIGURE 3 shows in more detail a schematic circuit arrangement for carrying out the functions of the respective boxes in FIGURE 2. These boxes are identified by dotted line enclosures, so that their correspondence with FIGURE 2 can be readily recognized. The scanner 10 is shown in the upper lefthand corner of the figure, and comprises the scanning means, conventionally shown as a cathode ray tube 11, which need have only a vertical linear sweep to produce a bright spot which is projected by means of lens **11*a* onto the surface containing the character, in this case indicated as the letter "A." It will be understood that the character being read, or rather, the sheet containing it and all other characters being read, are moving to the left as indicated by the arrow 11*b*. The path of the flying light spot on the paper is indicated by the double-headed arrow 11*c*, and as the sheet moves, this path produces the lines previously identified as 26, 28, 31, etc. (FIGURE 1). The reflected beam is focussed by another lens 11*d* onto photocell 11*e*, the output of which is passed through a conventional amplifier 11*f* through a quantizer circuit 13** to produce uniform pulses for each crossing of a character line.

Block 12 shows means for assigning a follower (setting the gate) provided that a gate is not already tracking the character line. Assume that no followers are tracking and more specifically, assume that scan line 26 crosses the left leading edge of the Character A at point 27. An information signal, for instance a pulse, is put out by scanner 10 through quantizer 13, and is fed to circuit network 12 on line 41 connected to a one shot multivibrator 42 which has a period long enough to determine whether any other followers are functioning. The determination is made by AND gate 44 whose inputs are from the one shot multivibrator 42 and an OR hit gate 46. Gate 46 inhibits the output from multivibrator 42 at gate 44 if there is a hit within a tracking follower. Otherwise gate 44 is satisfied so that the output thereof operates a shift pulse generator 48 which is operatively connected with a follower assignment shift register 50.

The purpose of this arrangement is to insure that the shift pulse generator 48 receives a pulse only each time there is a new crossing of the character being read. Thus, the very first crossing of the scan line at point 27 (FIGURE 1) passes a pulse, since there is no inhibiting pulse at this time on line **46*a*. However, the very next scan line 28 (FIGURE 1) also produces a pulse on line 41; however, this pulse will not pass gate 44, because, due to the fact that there was an "alpha hit" on the previous crossing, a pulse has appeared during this same interval (as will be explained in detail below) on line 60*a*, which passed through gate 46 and therefore provided an inhibiting pulse on line 46*a*, so that this pulse on line 41 does not get through to the shift pulse generator 48. The same action occurs on each succeeding crossing of the same line of the letter "A," so that no further pulses are fed to the shift pulse generator 48** until a second crossing occurs at the point marked "beta follower assigned" in FIGURE 1, as will be explained below.

The output on line 51 on the shift register resulting from the above first hit is fed to follower tracking circuit 14, there being a similar circuit (not shown in full) for each of the five or six followers required to identify all characters of the alpha-numeric system. The output on line 51 is applied through OR gate 15 to a one shot multivibrator 54 of a given duration (see FIGURE 5—timing chart). In this figure it is assumed that T is one scan time, defined herein as the time required for the scan element 24 to move from the bottom of area 22 to the top thereof and thereby create one scan line e.g. line 26, i.e. the time of 1 cycle of scan. Three additional, serially connected one shot multivibrators 55, 56 and 57 are activated by the output of multivibrator 54, the three multivibrators being entitled "Soon," "On Time" and "Late" to connote their functions.

Figure 4:
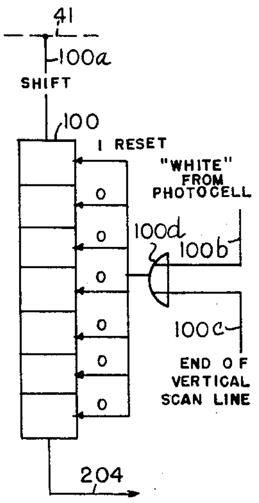
FIGURE 4 is a circuit of a "long" detector.

If the width of the gate is the time for spot 24 to move (FIGURES 1 and 1*a*) from point 2 to point 2′ (or 3–3′, etc.), we arbitrarily divide this time into three equal parts which we respectively label "Soon," "On Time" and "Late" and we assign the value (delta) to the duration of each of these parts, as shown in FIGURES 1*a* and 4. Obviously, the time for the spot to move from the center of a crossing on line 28 (center of "On Time") to the beginning of the area 2–2′ on next line 31 is T minus 3/2 delta. The time of multivibrator 54 is therefore, T minus 3/2 delta where delta is the time of Soon, On Time and Late as shown in FIGURES 1*a* and 4. For the first cycle, the beginning of the multivibrator "Soon" sets limit 1 (FIGURE 1*a*), while the trailing edge of "Late" provides limit 1′ time of the gate system and similarly for each succeeding cycle.

The outputs of Soon, On Time and Late on lines 55*a*, 56*a* and 57*a* respectively, are applied as inputs to OR gate 58. Consequently the gate 58 is set at a time slightly less than one scan time after point 27 by scan line 26 and remains sensitive or open until the expiration of Late multivibrator 57.

If there is a hit as at 59 (FIGURE 1*a*) so that the scanner output falls within the time gate 58 is open (or energized), this information (a pulse as shown in FIGURE 5) is AND gated as at 60 with the output from gate 58 whereby an output from AND gate 60 on line 61 will again start the cycle, i.e. trigger one shot multivibrator 54. This procedure repeats itself until the end of the character line being investigated.

It should be noted that at the same time that a pulse is emitted on line 61, this pulse also travels on line 60*a* through gate 46 and therefore produces an inhibiting pulse on line 46*a* as previously explained, so that the next crossing of the letter "A" (FIGURE 1) does not produce another shift pulse. This inhibiting pulse on line 46*a*, since it is of duration 3 delta, is effective during the entire time when a pulse might occur due to such a crossing. However, it should be noted that the pulse that does not pass gate 44 is passed on line 13*a* to AND gate 60 to continue the action previously described, so that the succeeding crossings of the upward-sloping leg of the "A" each produce an output through gate 60 which continues the action above described for each successive crossing. This alpha follower circuit continues to follow the sloping line of the letter "A" until it reaches the horizontal cross bar, which it then follows, since the upward sweep of the scanning line first hits the horizontal line before it hits the continuation of the slanting line. The alpha follower therefore continues tracking the horizontal line, until it intercepts the downward sloping leg of the letter "A" and then continues tracking this to the end (FIGURE 1*b*). However, after the upward sloping line of the first leg has reached the point of FIGURE 1, marked "beta follower assigned," where the vertical spacing between the two lines is greater than 3 delta, it is apparent that a second pulse will appear due to this second crossing, and since the signal on line 60*a* has now ended, there is no inhibiting pulse on line 46*a* at this time, so that this second pulse will now pass through the multivibrator 42 to produce a second shift pulse, and the shift pulse generator will be stepped down to stage beta, to produce a pulse on line 51*a*, which then energizes the beta follower 14′ in exactly the same manner as above described. Thus a second follower is assigned wherever a new line is crossed, while the alpha follower continues following the original line to the end. Any number of followers may be assigned in this way, depending upon the number of new crossings which the scanning spot encounters as it traverses the letter.

A reset bus 50*a* is provided for the shift register 50, whereby, when the end of the character has been scanned, a reset pulse on this bus will cause shift register to reset to its initial condition for use in reading a subsequent character, as will be shown below.

Means are provided for indicating a "long," that is, a long vertical line, such as is found in the letter "F," "T," or "I." For this purpose, a shift register 100 (FIGURE 4) may be used. Shift line 100*a* is energized by a "black signal" from photocell 11*e*, i.e. when the scan element crosses a line of the character. The actual connection of line 100*a* in the circuit may be made at several places, e.g. at amplifier 11*f* or line 41. The counter begins to step, and if it cycles completely, there is an output on line 204 identifying the feature of the character as a "long." However, if the feature of the character is not, in fact, a "long," counter 100 discontinues before reaching its last stage whereby no signal appears on line 204. Counter 100 is reset at the end of each scan line and is also reset when the scanner detects "white" (the absence of a part of the character) following a "black" (crossing of a part of the character). Reset lines 100*b* and 100*c*, OR gated at 100*d*, serve these purposes.

The information output from follower 14 and all others like it, is examined by the line follower recognition network 16 whereby the behavior of the gates is distinguished in order to be fed to the storage section 18.

It will be apparent now that we have produced means for following each continuous line of the character, and indicating, while it is being thus followed or traced, whether it slopes upwardly, downwardly, or extends horizontally. We also have an indication of whether a straight vertical line appears at any portion of the character. It will also be useful to identify certain other characteristics of the letter being traced, and it will now be shown how this may be done for certain typical characteristics. For example, it will be useful to know when two different lines of the character, such as the alpha line and the beta line, begin to diverge from a common point, in other words, when a line splits into two lines. Another useful characteristic is when two lines come together and join. Means for identifying these two characteristics will be shown with the alpha and beta lines by way of example, it being understood that the same technique can be extended to any other lines, such as gamma, delta, etc. The logical circuitry for identifying a "joint" is indicated within the dotted line enclosure 101 in FIGURE 3. It includes two OR gates 102, 104, the outputs of which are connected to an AND gate 110. OR gate 102 is supplied with two inputs, on lines 65*a* and 65*b* respectively, which means that this gate will pass a signal if the alpha line is either horizontal or slopes upwardly; similarly gate 104 will pass a signal if the beta line is either horizontal or slopes downwardly. A further condition is that these alpha and beta signals occur simultaneously. This obviously occurs only when beta and alpha are converging and finally come together. Thus an output signal on line 200 indicates the junction of an alpha and a beta line.

Dotted line enclosure 103 shows a logical circuitry for any "split" of the alpha and beta lines, for the condition where the alpha line occurs earlier in the sweep than the beta line. In this case OR gate 106 passes a signal whenever alpha is either horizontal or slopes downwardly; OR gate 108 passes a signal whenever the beta line is either horizontal or slopes upwardly. The remaining condition is that the alpha line occurs earlier in the sweep, and this is satisfied by delay unit 110 which may be a delay line of any suitable type providing a delay of approximately three delta, or rather, slightly more than this time delay, which is the condition which occurs when the beta line has just begun to diverge from the alpha line. If this were not provided, then for this condition, the alpha and beta signals would never coincide. Thus a signal on line 202 indicates the type of "split" described. The "split" and the "join" are respectively indicated by suitable symbols in the drawing adjacent the respective lines 202 and 200. It will be apparent that the same general technique can be used to identify other desired characteristics, e.g., when a line changes direction, or the junction of a vertical line with another line, etc.

It will be seen from the above that a number of wires are now provided, the excited condition of which indicates the respective slopes of the character which occur during the scanning also "splits" and "joins." If each of these energized wires is made to operate a suitable memory device, such as a conventional flip-flop, then the flip-flop switches energized as a result of the above described procedure will be characteristic of the letter, i.e., they will show that a letter has a certain alpha line having certain slopes, a beta line having certain slopes, etc., for as many lines as the system actually detects in the character. In addition, it will show whether a vertical line occurs during the scanning of the character and will also show when any two lines either join or split. This information alone is sufficient in most cases to distinguish the various characters of a system. However, in order to provide still further information for finer differentiation of the respective characters, it may be desirable to divide the scanning into several zones, and one manner of doing this is shown. Referring to FIGURE 1, it will be seen that the character is divided into three zones designated respectively as "slot I," "slot II," and "slot III." It is desired to provide information concerning the features of the character in each one of these zones or slots. To enable this, three sets of flip-flops are provided, each set corresponding to one of the three zones above described. A three-stage register 114 is provided, and one set of flip-flops is associated with each stage. For example, when stage 1 of zoning register 114 is active, line 116 is energized; when stage 2 is active, line 118 is energized, and when stage 3 is active, line 120 is energized. Line 116 is connected to a series of flip-flops associated with zone I, and conditions these flip-flops for reception of signals from the respective characteristic lines above described, such as lines *65a*, *b* and *c*, for the alpha follower; lines *165a*, *b*, and *c*, for the beta follower, etc., as well as lines 200 and 202 for the "join" and "split" conditions, and line 204 for the vertical line detector. Assuming the characters to be equally spaced, as on a typewriter, the input on line 113 to step the timing register 114 may be timed to coincide with the beginning of each space, by means not a part of this invention. One means for doing this is shown in the copending application of Jacob Rabinow, Serial No. 68,892, filed November 14, 1960, for Method and Means to Determine Separation Between Characters. Alternatively, a "pre-look" system may be employed to scan each character before it reaches the reading station 10, and provide three pulses on line 113 of the proper frequency to divide the character into three parts. Means for doing this are known, and are not a part of the present invention. One such means might include condenser means charged during the "pre-look" in accordance with the length of the character, and discharged at the reading station as soon as reading begins, through a reactance tube circuit to control the frequency thereof in accordance with the desired rate. Still simpler, the OR hit signal on line 61 may be used to initiate the stepping where a uniformly space font is used. Whichever technique is employed, the result is that lines 116, 118, and 120 are successively energized during the reading of the character. It will be understood that special provision must be made for the letter "I" but this letter is so different from all the others that this can readily be done.

Considering by way of example the letter "A," it will be seen by reference to FIGURE 1, that during slot I, when line 116 is energized, the initial upward slope of the letter "A" will energize line *65a* as described above, and since both inputs to flip flop 122 are now energized, this flip flop will be set and line *65a*(I) will therefore become energized. It will be noted that this flip flop also has an output to line $\overline{65a(\mathrm{I})}$, this being the logical symbol for negation. This means that the second output, which is energized in the un-set condition (or reset condition) of the flip flop is the negation of the output on line *65a*(I), that is, when one output is positive, the other is negative. This particular negation is not employed in the "A" matrix, since in slot I the assertion *65a*(I) is employed instead, that is, the desired condition is for the upward slope to occur at this time; however, an example of the use of the negation is given at the bottom of the "A" matrix by showing the last resistor of the matrix connected to the negation line $\overline{65a(\mathrm{III})}$. This means that in slot III, for the letter "A" there should be no upward slanting alpha line—if the letter being read contains such a line, then the assertion will be energized, and the negation of this flip flop will not be energized, and therefore the voltage on the last resistor will be low instead of high, assuming all the other resistors of the "A" matrix go high when the assertions are applied, and the "A" matrix output will be diminished accordingly. In practice, a number of such negations are used, in order to more positively distinguish the "A" from any other letter with which it might be confused, for example, the letter "W," which would obviously have an assertion connection in slot III for the alpha "late" line, since the last line of the "W" slopes upwardly. Similarly, the letter "I" would be distinguished from the letters "E" or "F," both of which also begin with a "long" by having connections to the negations for the horizontal lines which occur in the latter two letters but not in the letter "I." If this were not done, then it is apparent that the letter "I" would always be indicated whenever any other letter with a "long" occurs such as "E," "F," etc. The use of negation leads to definitely indicate that a letter is not some other letter which it might otherwise resemble is not per se a part of the present invention, but is described in the copending application of Rabinow et al., Serial No. 32,911, now Patent No. 3,104,369, previously referred to.

A separate resistance matrix will be employed for each letter of the system of characters being read, as well as for numerals, special characters, etc. By way of example only, the connections to the "A" matrix are shown, and a part of the "B" matrix is also shown in FIGURE 3, with some of the leads connecting the resistors to the proper flip flops for distinguishing the letter "B." It will be understood that a similar matrix is provided for every other character, all of the matrices being connected to flip flop leads necessary to distinguish that particular character. The output voltages of the respective matrices are all fed into a "Best Match Comparator" 210, which selects the matrix having the highest voltage, i.e., the highest correlation with the flip flop switch energized, in the manner described in the previously mentioned copending application of Rabinow et al., Serial No. 32,911. In the case shown in FIGURE 1, the "A" lead 212 will be selected, as can be verified, by tracing the connections shown, and comparing them with the actual slopes and junctions which occur in the letter "A." This will now be explained in more detail.

Considering "slot I" of FIGURE 1, it will be seen that in this division of the character "A," the alpha line first slopes upwardly and then extends horizontally. The circuitry arrangement previously described will respond to this by energizing line *65a* for the upward slope (alpha "late"), and when the register 114 is in its first stage (slot I) flip flop 122 will be energized, which means that the assertion line *65a*(I) is energized. Similarly, the horizontal line portion of the alpha line will energize line *65b*(I), to which the next resistor of the matrix is connected. During this interval, the beta line also begins on an upward slope, and therefore line *165a*(I) is energized as the result of this determination of the beta follower. At the same time, a split between the alpha and beta lines occurs, and this energizes line 202(I). It will thus be seen that during slot (I) only these flip flops will be energized, and their effect will be to raise the output voltage of the "A" matrix. In similar fashion, during slots II and III, the remaining resistors of the "A" matrix will be energized, including the negative assertion described above. It will be understood that all of the flip flops remain energized during the operation described, until the end of slot III, when the register 114 is reset by a pulse emitted on line 126. This reset pulse is used also to reset all of the flip flops simultaneously at this time, only one such reset line 128 being shown by way of example. Thus the entire set of flip flops is ready after each character has been scanned to perform a similar operation on the next character which presents itself. At the same time, reset line 126 can also be used as a source of reset signals for every other device in the circuit of FIGURE 3 which should be reset at the end of the reading of each character, to prepare for the reading of the next character. This includes all flip flops which have been set as a result of a character reading, and also includes the follower assign register 50, which can be reset at this time by a pulse on line 50*a*, which may also be derived from line 126. It will be understood that all shift registers, stepping counters, flip flops, etc., employed in modern computer circuitry are normally provided with reset input terminals, so that these devices can be readily reset at the end of each of their respective operations.

Although the invention has been described in connection with a "Best Match Comparator" circuit, it will be understood that this need not be used in all cases. If the invention is to be used for reading characters which are well delineated, it may be sufficient to merely provide an output circuit from each matrix which delivers an output signal only if the matrix is raised to, say 90 percent of its full output value, i.e., say, all but one of its input lines is energized. In practice, with perfect letters, all of the input lines will, of course, be energized for the correct character, and its output voltage will therefore be at a maximum even if the letter is slightly imperfect, so that even if one input is missed, this will still be much closer than the match which occurs for any of the other characters of the system, since obviously with the system described each one of them will miss a larger number of lines, even in the case of characters which fairly closely resemble each other. Therefore, with sufficiently good characters, it will be unnecessary to use the Best Match Comparator, and will be adequate merely to indicate that if a very close match is achieved in any instance, that is the correct letter.

It sometimes happens that there is an imperfection in the letter being read, which causes a small break in the line of the letter. Such a break is shown at 90 in FIGURE 1. This would ordinarily cause discontinuance of the alpha follower line, since on the first scan (indicated by the dotted line 90*a* which pass clear through the break), there would be failure of a signal on line 13*a*, and therefore the multivibrator 54 would cease to function and the trace would be lost. In order to prevent this from happening, a "Flywheel" circuit may be provided if desired, which provides the missing pulse on line 222 in such an eventuality, for one or two successive scans, so that if the line is again picked up after a small break, no harm will be done. Simple means for doing this is shown in FIGURE 5*a* and comprises a line 220 supplying clock pulses at the repetition rate of the scan. These pulses may, for example, be conveniently derived from the flyback circuit of the cathode ray tube 11 and are used to step a short stepping counter 221 to provide the "miss" pulses on line 222 which are fed to OR gate 15 (FIGURE 1). As long as the line is continuous, considering the alpha line for example, there will be a signal during each vertical scan on "alpha hit" line 61. This signal is used to inhibit gate 223 so that the clock pulses on line 220 do not normally pass to step the counter 221. However, if there should be a break in the line, then the "alpha hit" signal would not appear on line 61 during the first vertical scan which passes through the break, and therefore the clock pulse 220 would be passed through gate 223 to the stepping counter to step it along. The rate of the stepping counter is made equal to the time interval between vertical scans, so that the pulses on line 222 are properly timed. In the arrangement shown, stages I and II of the counter have outputs which are fed through OR gate 226 to the "miss" line 222. It will be apparent that as many stages may be utilized as desired, but in the example shown, it is assumed that if the gap is larger than two vertical scan line spacings, then it is the end of the line; therefore, the last stage of the counter is not connected to OR gate 226, and when this stage is reached, no further "miss" pulses will be produced on line 222 and the alpha line follower will be extinguished. If the line should be picked up after the first stage or the second, the alpha hit line 61 will again be energized, and this is shown connected also to the reset line 228 of the counter, so that the counter is immediately reset to its initial condition. Since when this occurs, no clock pulses on line 220 can be passed through gate 223, the counter will remain in its initial stage, ready for action. A similar "flywheel" will be provided for the beta follower and all of the other followers.

It is understood that various changes may be made without departing from the invention. The illustrated and described embodiments of the invention are given by way of example only, and are not intended to limit the invention beyond the limitations of the following claims.

I claim:

1. Character recognition apparatus using curve tracing in one general direction comprising a line scanner, a memory fed by the output of the scanner when a first scan line crosses a character line, gating means establishing a time area related to the next scan line and sensitive to an ouput resulting from the second scan line crossing the line of the character, means to feed said memory with the last mentioned output, and decision means to identify the character by the information fed to said memory.

2. Character recognition apparatus comprising a line scanner producing an output pulse when a first scan line crosses a line of the character, gating means responsive to said output pulse which become set at time limits related to the next scan, ahead and behind the time of one scan line to form a time sub area related to the second scan line sensitive to an output caused by a crossing of the character line by said second scan line, memory means fed by the output from the crossing of the character lines in said area, and decision means fed by said memory means to identify the character on the basis of information from said memory means.

3. In character recognition apparatus having a scanner for an area, means responding to outputs from the scanner for identifying the character by character investigation in one general direction, said means comprising a gate system which becomes set during a next scan line crossing of a character line in response to a first output resulting from the previous scan line crossing, the gate system being set for a duration slightly earlier and slightly later than the time of one scan line crossing to define limits of the gate means responding to an output from the scanner which falls within said limits to again set the gating system with new limits, means to recognize the behavior of the gate system and develop a representative output, and decision means fed by said representative output.

4. The apparatus of claim 3 wherein there is a second gate system similar to the first mentioned gate system, said second gate system becoming set in response to a scanner output which does not fall within any said limits and while said first gate system is operating.

5. The apparatus of claim 3 wherein said gating means includes an OR gate having inputs which identify the time within said limits where said scanner outputs falls thereby identifying the slope of the character line being scanned.

6. In a character reader, a line producing scanner for an area having a character, there being relative movement between the scan lines and the area, means to recognize a first crossing of a character line by a scan line, a gate system set by the first crossing, recognition means to become sensitive to a crossing of the character line by the second scan line within a predetermined sub area of the second scan line time and produce an output if the second scan line crosses the character line in said sub area, means responsive to said output to again set said gate system to produce a similar sub area in the third scan line time and continue to set said gate system so long as scan lines cross the character line within said sub areas, means responsive to said outputs to recognize the behavior of the trace of the character line formed by the propagation of scan line crossings within said sub areas, and storage means fed by said behavior recognition means.

7. The character reader of claim 6 and a second gate system which becomes set similar to the setting of the first-mentioned gate system when a scan line crosses a character line and the crossing is not within said sub area or when the said first crossing is longer than a predetermined reference.

8. The character reader of claim 7 wherein there are means to discriminate against significant character line terminations and print imperfections.

9. The character reader of claim 7 and decision means fed by said storage means to identify the character.

10. The character reader of claim 7 wherein said scan lines are at right angles to the direction of movement of said area, and considered in relation to the movement of said area and the scan lines the character lines are investigated in one general direction.

11. A reading machine comprising a scanner to scan a character; means responsive to a scanner output for establishing limits in the direction of the scan forming a sub area sensitive to a subsequent scanner output falling therein, and for continuing to form additional sub areas in response to the occurrence of outputs falling within the previous sub area, means to recognize the behavior of said outputs falling within said sub areas and produce a characteristic output signal, and decision means fed by said signal to identify the character.

12. In a character recognition apparatus for a character or an area, a scanner to scan the area in one general direction, a first character line follower triggered in response to an output from said scanner, said follower including a gate system which is set to be sensitive to a scanner output within a given width representing an area of the character to one side of the point of the scan intersection with the character line that caused the first output, means to again set said gate in response to a scanner output within said set gate thereby propagating the gate along the character line so long as the character line is continuous, a second line follower including a gate similar to said first follower gate, means to render said second follower operative in response to a predetermined output pattern from said scanner, and means to store information regarding the behavior of the outputs falling within said gates.

13. The apparatus of claim 12 wherein said area moves irreversibly in one direction with respect to said scanner and said scanner is a line producing device, and said means to set said gate actually setting the gate to coincide with the scan line following the line which produced said first output.

14. The apparatus of claim 13 wherein the width of the gate is less than the time of one scan and wherein the center of the gate is essentially exactly the time of one scan line after the scan line intersection with the character line which caused the said first output.

References Cited in the file of this patent

UNITED STATES PATENTS 2,889,535 Rochester et al. ---------- June 2, 1959